(12) United States Patent
Shirley et al.

(10) Patent No.: US 10,577,955 B2
(45) Date of Patent: Mar. 3, 2020

(54) AIRFOIL ASSEMBLY WITH A SCALLOPED FLOW SURFACE

(71) Applicant: General Electric Company, Schenectady, NY (US)

(72) Inventors: Connor Marie Shirley, Cincinnati, OH (US); Harjit Singh Hura, Cincinnati, OH (US); Paul Hadley Vitt, Liberty Township, OH (US)

(73) Assignee: General Electric Company, Schenectady, NY (US)

( * ) Notice: Subject to any disclaimer, the term of this patent is extended or adjusted under 35 U.S.C. 154(b) by 317 days.

(21) Appl. No.: 15/637,791

(22) Filed: Jun. 29, 2017

(65) Prior Publication Data

US 2019/0003323 A1  Jan. 3, 2019

(51) Int. Cl.
| | | |
|---|---|---|
| *F01D 9/04* | (2006.01) | |
| *F04D 29/54* | (2006.01) | |
| *F01D 5/14* | (2006.01) | |

(52) U.S. Cl.
CPC ............. *F01D 9/041* (2013.01); *F01D 5/143* (2013.01); *F04D 29/544* (2013.01); *F05D 2220/32* (2013.01); *F05D 2240/121* (2013.01); *F05D 2240/122* (2013.01); *F05D 2240/123* (2013.01); *F05D 2240/124* (2013.01); *F05D 2240/305* (2013.01); *F05D 2240/306* (2013.01); *F05D 2240/80* (2013.01); *F05D 2250/20* (2013.01); *F05D 2250/611* (2013.01)

(58) Field of Classification Search
CPC ........ F01D 5/143; F01D 9/041; F04D 29/321; F04D 29/322; F04D 29/324; F04D 29/329; F04D 29/542; F04D 29/544; F04D 29/681; F05D 2240/80; F05D 2250/20; F05D 2250/611; F05B 2240/80; F05B 2250/20; F05B 2250/611
See application file for complete search history.

(56) References Cited

U.S. PATENT DOCUMENTS

| | | |
|---|---|---|
| 123,322 A | 1/1872 | Cathell |
| 2,918,254 A | 12/1959 | Hausammann |
| 4,138,857 A | 2/1979 | Dankowski |
| 4,420,288 A | 12/1983 | Bischoff |
| 4,465,433 A | 8/1984 | Bischoff |
| 6,158,962 A | 12/2000 | Lee et al. |
| 6,283,713 B1 | 9/2001 | Harvey et al. |
| 6,419,446 B1 | 7/2002 | Kvasnak et al. |
| 6,669,445 B2 | 12/2003 | Staubach et al. |
| 6,969,232 B2 | 11/2005 | Zess et al. |
| 6,991,428 B2 | 1/2006 | Crane |
| 7,134,842 B2 | 11/2006 | Tam et al. |
| 7,465,155 B2 | 12/2008 | Nguyen |
| 7,510,366 B2 | 3/2009 | Okubo et al. |

(Continued)

FOREIGN PATENT DOCUMENTS

EP  1939397 A2  2/2008

*Primary Examiner* — Justin D Seabe
*Assistant Examiner* — Christopher R Legendre
(74) *Attorney, Agent, or Firm* — McGarry Bair PC

(57) ABSTRACT

A stage for a compressor or a turbine in a turbine engine can include an annular row of airfoils radially extending from corresponding platforms, where each platform can include a fore edge and aft edge and each airfoil can include a leading edge and trailing edge. At least one of the platforms can have a scalloped flow surface including a bulge and a trough.

40 Claims, 8 Drawing Sheets

(56) References Cited

U.S. PATENT DOCUMENTS

| | | |
|---|---|---|
| 7,510,367 B2 | 3/2009 | Liang |
| 7,690,890 B2 | 4/2010 | Aotsuka et al. |
| 7,717,904 B2 | 5/2010 | Suzuki et al. |
| 7,887,297 B2 | 2/2011 | Allen-Bradley et al. |
| 7,963,742 B2 | 6/2011 | Clouse et al. |
| 8,167,557 B2 | 5/2012 | Elliott et al. |
| 8,177,499 B2 | 5/2012 | Iida |
| 8,192,153 B2 | 6/2012 | Harvey et al. |
| 8,192,154 B2 | 6/2012 | Sonoda et al. |
| 8,206,115 B2 | 6/2012 | Gupta et al. |
| 8,511,978 B2 | 8/2013 | Allen-Bradley et al. |
| 8,517,686 B2 | 8/2013 | Allen-Bradley et al. |
| 8,647,006 B2 | 2/2014 | Greer, Jr. et al. |
| 8,807,930 B2 | 8/2014 | Green et al. |
| 9,004,865 B2 | 4/2015 | Guimbard et al. |
| 9,085,985 B2 | 7/2015 | Barr et al. |
| 9,518,467 B2 | 12/2016 | Guimbard et al. |
| 2003/0129055 A1 | 7/2003 | Leeke et al. |
| 2004/0081548 A1 | 4/2004 | Zess et al. |
| 2004/0253110 A1 | 12/2004 | Crane |
| 2006/0120864 A1 | 6/2006 | Lu et al. |
| 2006/0140768 A1 | 6/2006 | Tam et al. |
| 2006/0127220 A1 | 7/2006 | Lee |
| 2006/0153681 A1 | 7/2006 | Lee et al. |
| 2006/0233641 A1 | 10/2006 | Lee et al. |
| 2007/0258810 A1 | 11/2007 | Aotsuka et al. |
| 2007/0258819 A1 | 11/2007 | Allen-Bradley et al. |
| 2008/0050223 A1 | 2/2008 | Liang |
| 2008/0135530 A1 | 6/2008 | Lee et al. |
| 2008/0145210 A1 | 6/2008 | Lee et al. |
| 2008/0232968 A1 | 9/2008 | Nguyen |
| 2009/0035130 A1 | 2/2009 | Sonoda et al. |
| 2009/0112776 A1 | 4/2009 | Kathwari et al. |
| 2009/0162193 A1 | 6/2009 | Mariotti et al. |
| 2010/0034663 A1 | 2/2010 | Elliott et al. |
| 2010/0158696 A1 | 6/2010 | Pandey et al. |
| 2011/0014056 A1 | 1/2011 | Guimbard et al. |
| 2011/0039352 A1 | 2/2011 | Rentzeperis et al. |
| 2011/0044818 A1 | 2/2011 | Kuhne et al. |
| 2011/0052387 A1 | 3/2011 | Kneeland et al. |
| 2011/0110788 A1 | 5/2011 | Guimbard et al. |
| 2011/0189023 A1 | 8/2011 | Guimbard et al. |
| 2011/0243749 A1 | 10/2011 | Praisner et al. |
| 2012/0201688 A1 | 8/2012 | Mahle et al. |
| 2012/0201692 A1 | 8/2012 | Boston et al. |
| 2013/0004331 A1 | 1/2013 | Beeck |
| 2013/0224027 A1 | 8/2013 | Barr et al. |
| 2015/0147179 A1 | 5/2015 | Guimbard et al. |
| 2019/0003323 A1* | 1/2019 | Shirley .................. F01D 9/041 |

* cited by examiner

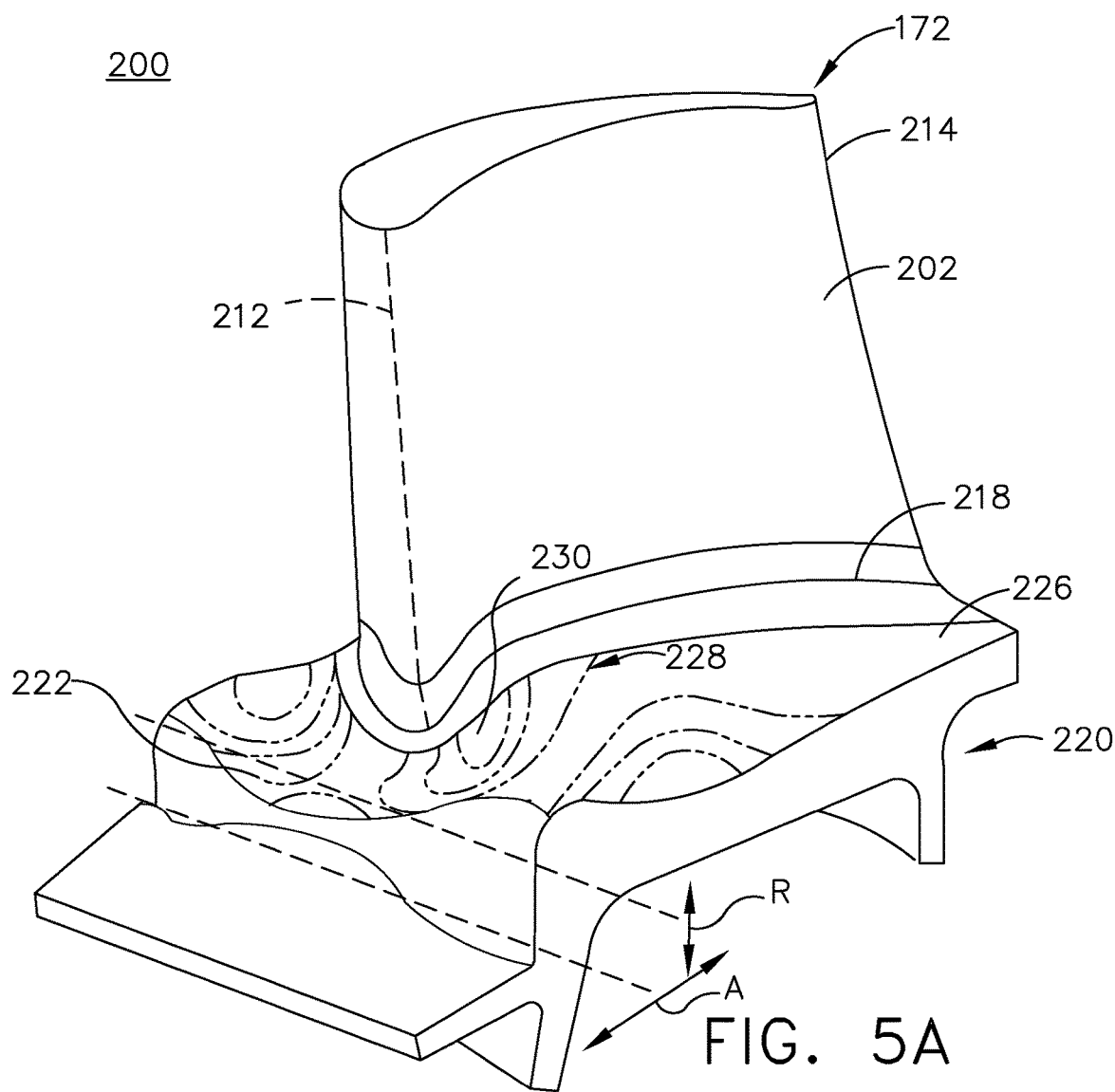
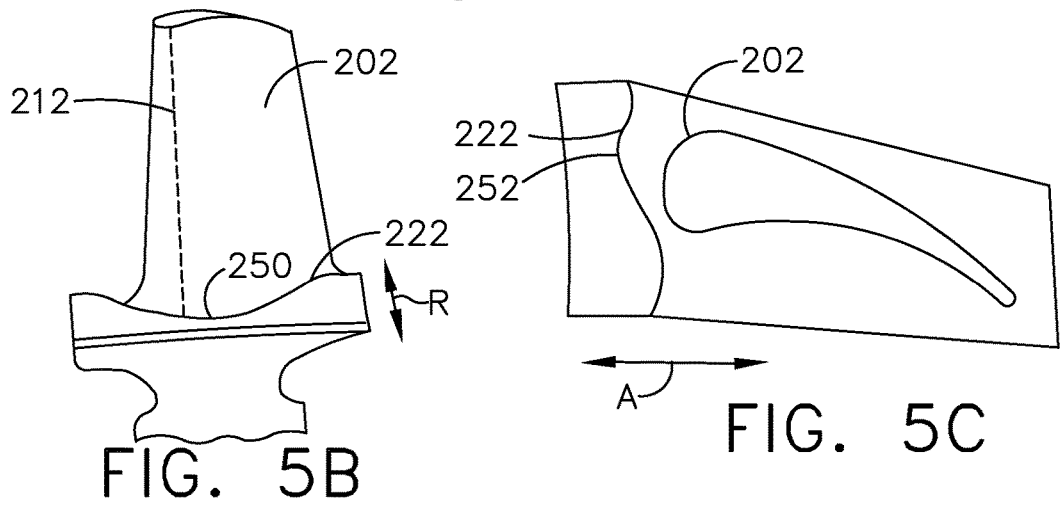

AIRFOIL ASSEMBLY WITH A SCALLOPED FLOW SURFACE

BACKGROUND OF THE INVENTION

Turbine engines, and particularly gas or combustion turbine engines, are rotary engines that extract energy from a flow of pressurized combusted gases passing through the engine onto a multitude of rotating turbine blades.

Gas turbine engines for aircraft can include multiple stages designed with a plurality of airfoils extending from flow surfaces which can be scalloped. Scalloping can redirect airflows moving through the stages and increase the operating efficiency of the engine.

BRIEF DESCRIPTION OF THE INVENTION

In one aspect, a stage for at least one of a compressor or a turbine in a turbine engine, can include an annular row of airfoils radially extending from corresponding platforms, with the airfoils circumferentially spaced apart to define intervening flow passages. Each platform can have a fore edge and an aft edge, and each airfoil can have an outer wall defining a pressure side and a suction side, opposite the pressure side, with the outer wall extending axially between a leading edge and a trailing edge defining a chord-wise direction, and extending radially between a root and a tip defining a span-wise direction, with the root adjacent the platform and the leading edge aft of the fore edge of the platform. At least one of the platforms can have a scalloped flow surface including a bulge adjacent the pressure side and a trough adjacent the suction side, where the bulge can have a portion extending forward of the fore edge and a local maximum located aft of the fore edge and spaced from the pressure side to define a bulge flow channel between the bulge and the pressure side, and the trough can extend adjacent at least a portion of the suction side with a fore portion of the trough located in front of the leading edge.

In another aspect, a stage for a turbine in a turbine engine, can include an annular row of airfoils radially extending from corresponding platforms, with the airfoils circumferentially spaced apart to define intervening flow passages. Each platform can have a fore edge and an aft edge and a cavity fore of the fore edge, and each airfoil can have an outer wall defining a pressure side and a suction side, opposite the pressure side, with the outer wall extending axially between a leading edge and a trailing edge defining a chord-wise direction, and extending radially between a root and a tip defining a span-wise direction, with the root adjacent the platform and the leading edge aft of the fore edge of the platform. At least some of the platforms can have a scalloped flow surface including a bulge adjacent the pressure side and a trough adjacent the suction side, where the bulge can have a portion extending into the cavity and a local maximum located aft of the fore edge and spaced from the suction side to define a bulge flow channel between the bulge and the pressure side, and the trough can extend along at least a portion of the suction side and into the cavity, with a portion of the trough located in front of the leading edge.

BRIEF DESCRIPTION OF THE DRAWINGS

In the drawings:

FIG. 5A is a forward isometric view of the airfoil assembly of FIG. 1 according to a second embodiment of the disclosure.

FIG. 5B is a forward axial view of the airfoil assembly of FIG. 5A.

FIG. 5C is a top radial view of the airfoil assembly of FIG. 5A.

DESCRIPTION OF EMBODIMENTS OF THE INVENTION

Figure 1:
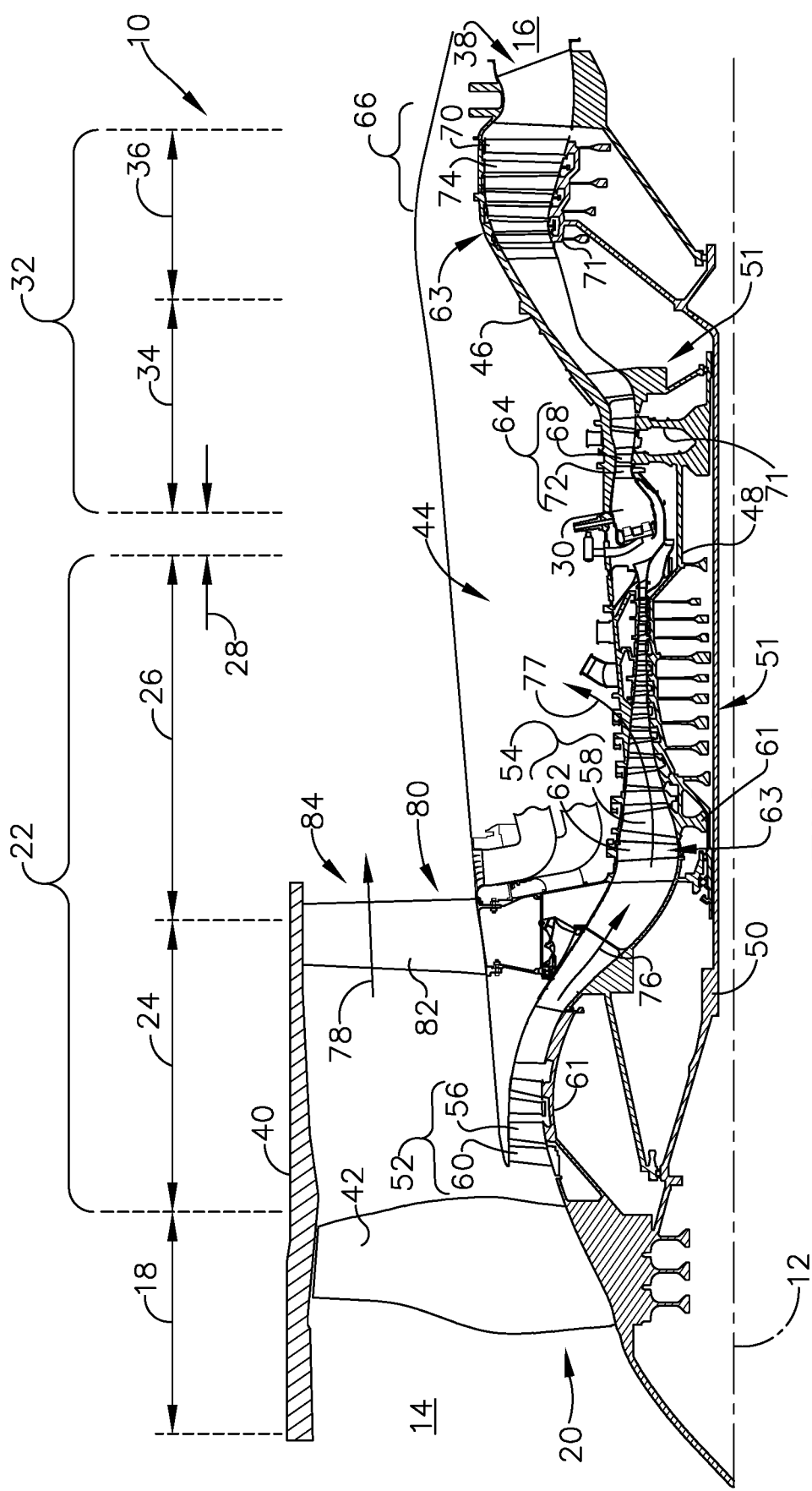
FIG. 1 is a schematic cross-sectional diagram of a turbine engine for an aircraft including an airfoil assembly in accordance with various aspects described herein.

The described embodiments of the present disclosure are directed to a flow surface in a stage of a turbine engine. For purposes of illustration, the present disclosure will be described with respect to the turbine for an aircraft turbine engine. It will be understood, however, that the disclosure is not so limited and may have general applicability within an engine, including compressors, as well as in non-aircraft applications, such as other mobile applications and non-mobile industrial, commercial, and residential applications.

As used herein, the term "forward" or "upstream" refers to moving in a direction toward the engine inlet, or a component being relatively closer to the engine inlet as compared to another component. The term "aft" or "downstream" used in conjunction with "forward" or "upstream" refers to a direction toward the rear or outlet of the engine or being relatively closer to the engine outlet as compared to another component.

Additionally, as used herein, the terms "radial" or "radially" refer to a dimension extending between a center longitudinal axis of the engine and an outer engine circumference.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of the disclosure. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

FIG. 1 is a schematic cross-sectional diagram of a gas turbine engine 10 for an aircraft. The engine 10 has a generally longitudinally extending axis or centerline 12 extending forward 14 to aft 16. The engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38.

The fan section 18 includes a fan casing 40 surrounding the fan 20. The fan 20 includes a plurality of fan blades 42 disposed radially about the centerline 12. The HP compressor 26, the combustor 30, and the HP turbine 34 form a core 44 of the engine 10, which generates combustion gases. The core 44 is surrounded by core casing 46, which can be coupled with the fan casing 40.

A HP shaft or spool 48 disposed coaxially about the centerline 12 of the engine 10 drivingly connects the HP turbine 34 to the HP compressor 26. A LP shaft or spool 50, which is disposed coaxially about the centerline 12 of the engine 10 within the larger diameter annular HP spool 48, drivingly connects the LP turbine 36 to the LP compressor 24 and fan 20. The spools 48, 50 are rotatable about the engine centerline and couple to a plurality of rotatable elements, which can collectively define a rotor 51.

The LP compressor 24 and the HP compressor 26 respectively include a plurality of compressor stages 52, 54, in which a set of compressor blades 56, 58 rotate relative to a corresponding set of static compressor vanes 60, 62 to compress or pressurize the stream of fluid passing through the stage. In a single compressor stage 52, 54, multiple compressor blades 56, 58 can be provided in a ring and can extend radially outwardly relative to the centerline 12, from a blade platform to a blade tip, while the corresponding static compressor vanes 60, 62 are positioned upstream of and adjacent to the rotating blades 56, 58. It is noted that the number of blades, vanes, and compressor stages shown in FIG. 1 were selected for illustrative purposes only, and that other numbers are possible.

The blades 56, 58 for a stage of the compressor can be mounted to (or integral to) a disk 61, which is mounted to the corresponding one of the HP and LP spools 48, 50. The vanes 60, 62 for a stage of the compressor can be mounted to the core casing 46 in a circumferential arrangement.

The HP turbine 34 and the LP turbine 36 respectively include a plurality of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine blades 68, 70 can be provided in a ring and can extend radially outwardly relative to the centerline 12 while the corresponding static turbine vanes 72, 74 are positioned upstream of and adjacent to the rotating blades 68, 70. It is noted that the number of blades, vanes, and turbine stages shown in FIG. 1 were selected for illustrative purposes only, and that other numbers are possible.

The blades 68, 70 for a stage of the turbine can be mounted to a disk 71, which is mounted to the corresponding one of the HP and LP spools 48, 50. The vanes 72, 74 for a stage of the compressor can be mounted to the core casing 46 in a circumferential arrangement.

Complementary to the rotor portion, the stationary portions of the engine 10, such as the static vanes 60, 62, 72, 74 among the compressor and turbine sections 22, 32 are also referred to individually or collectively as a stator 63. As such, the stator 63 can refer to the combination of non-rotating elements throughout the engine 10.

In operation, the airflow exiting the fan section 18 is split such that a portion of the airflow is channeled into the LP compressor 24, which then supplies pressurized air 76 to the HP compressor 26, which further pressurizes the air. The pressurized air 76 from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the exhaust gas is ultimately discharged from the engine 10 via the exhaust section 38. The driving of the LP turbine 36 drives the LP spool 50 to rotate the fan 20 and the LP compressor 24.

A portion of the pressurized airflow 76 can be drawn from the compressor section 22 as bleed air 77. The bleed air 77 can be drawn from the pressurized airflow 76 and provided to engine components requiring cooling. The temperature of pressurized airflow 76 entering the combustor 30 is significantly increased. As such, cooling provided by the bleed air 77 is necessary for operating of such engine components in the heightened temperature environments.

A remaining portion of the airflow 78 bypasses the LP compressor 24 and engine core 44 and exits the engine assembly 10 through a stationary vane row, and more particularly an outlet guide vane assembly 80, comprising a plurality of airfoil guide vanes 82, at the fan exhaust side 84. More specifically, a circumferential row of radially extending airfoil guide vanes 82 are utilized adjacent the fan section 18 to exert some directional control of the airflow 78.

Some of the air supplied by the fan 20 can bypass the engine core 44 and be used for cooling of portions, especially hot portions, of the engine 10, and/or used to cool or power other aspects of the aircraft. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid can be, but are not limited to, fluid discharged from the LP compressor 24 or the HP compressor 26.

Figure 2:
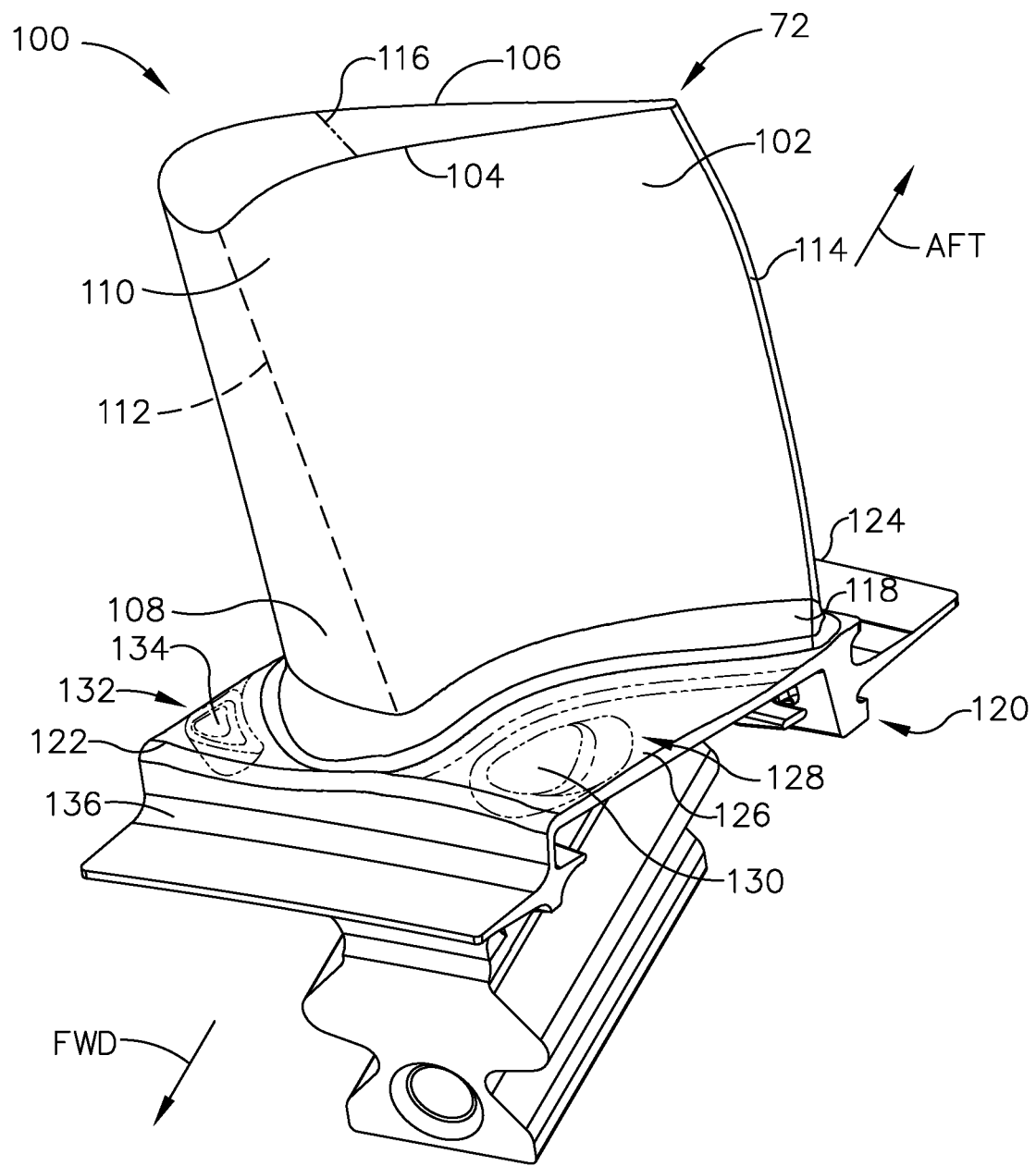
FIG. 2 is an isometric view of the airfoil assembly of FIG. 1 according to a first embodiment of the disclosure.

Turning to FIG. 2, an airfoil assembly 100 can include an airfoil, illustrated herein as the HP turbine vane 72, radially extending from a platform 120 as shown. It will be understood that while illustrated with the vane 72, the airfoil assembly 100 can include any rotating or non-rotating airfoil within the engine 10, including any one or more of the turbine blades 56, 58, 68, 70 or vanes 60, 62, 72, 74 in the compressor section 22 or the turbine section 32.

The vane 72 can have an outer wall 102 defining a pressure side 104 and a suction side 106 opposite the pressure side 104. The vane 72 can extend radially between a root 108 and tip 110, as well as axially between a leading edge 112 and a trailing edge 114, where a maximum thickness point 116 can be located between the leading edge 112 and the trailing edge 114. In addition, a fillet 118 can provide additional connection between the outer wall 102 and the platform 120 at the root 108, and can extend about the periphery of the outer wall 102 or a portion thereof as desired.

The platform 120 can include a fore edge 122, an aft edge 124, and a flow surface 126. When assembled, the root 108 can be adjacent the platform 120 with the leading edge 112 of the vane 72 positioned aft of the fore edge 122 of the platform 120. The flow surface 126 can have a scalloped geometry wherein contour lines illustrate that a bulge 128 with a local maximum 130 can be formed adjacent the pressure side 104, and a trough 132 with a local minimum 134 can be formed extending adjacent at least a portion of the suction side 106. The fillet 118 can be positioned between the suction side 106 and trough 132, and also positioned between the pressure side 104 and bulge 128 as shown. The platform 120 can also include a cavity 136 forward of the fore edge 122, where the bulge 128 and trough 132 can extend at least partially into the cavity 136 in a non-limiting example. It will be understood that the flow surface 126 can contain more than one bulge 128 or trough 132 as desired.

Figure 3:
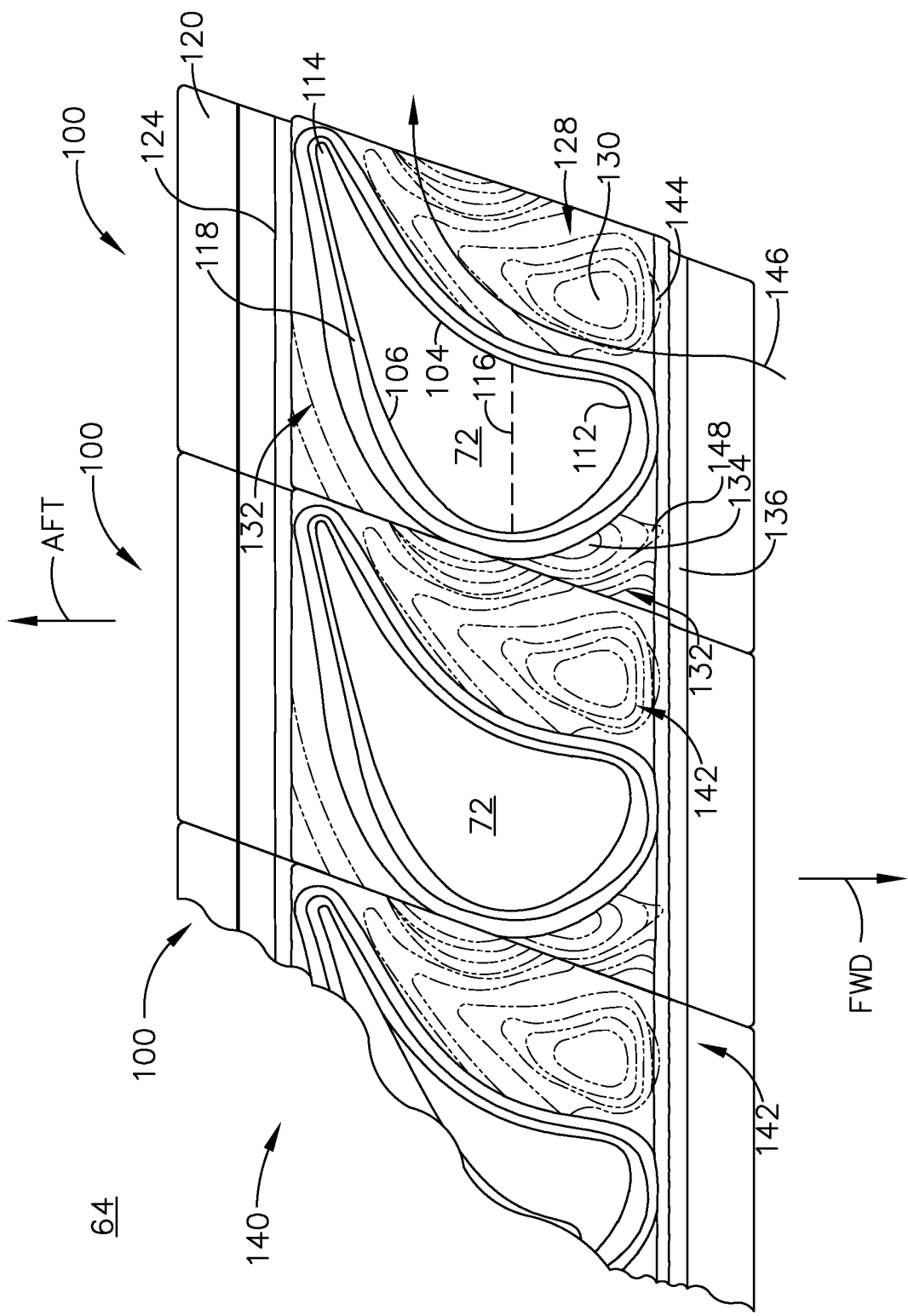
FIG. 3 is an isometric view of a row of airfoil assemblies of FIG. 2 in a first configuration.

FIG. 3 illustrates a portion of a stage, such as the HP turbine stage 64 (FIG. 1), having an annular row 140 of airfoil assemblies 100 in a first configuration. The vanes 72 can be circumferentially spaced apart to define intervening flow passages 142. At least some of the platforms 120 in the stage 64 can include scalloped flow surfaces 126 where the bulge 128 in each includes a bulge portion 144 extending forward of the fore edge 122. The local maximum 130 of the bulge 128 can be located aft of the fore edge 122 of the platform 120, and can also be aft of the leading edge 112 of the vane 72, to define a bulge flow channel 146 between the bulge 128 and pressure side 104 in each flow channel 142. The bulge 128 can also extend along the pressure side 104 and terminate prior to the trailing edge 114 of the vane 72.

The trough 132 can include a fore portion 148 that can be positioned forward of the maximum thickness point of the vane 72 and extend into the cavity 136. The trough 132 can include at least one local minimum 134; it is contemplated that the maximum depth of the trough 132 can be smaller than the maximum height of the bulge 128.

The trough 132 can extend along the suction side 106 to the trailing edge 114 of the vane 72; in another non-limiting example, the trough 132 can terminate such that no portion of the trough 132 extends aft of the maximum thickness point 116 of the vane 72.

In operation, air flowing from blades such as the HP turbine blades 70 can be directed to the vanes 72, moving into the trough 132 and along the suction side 106, as well as moving through the bulge flow channel 146 and remaining adjacent to the pressure side 104, as it flows past a stage in the engine 10.

Figure 4:
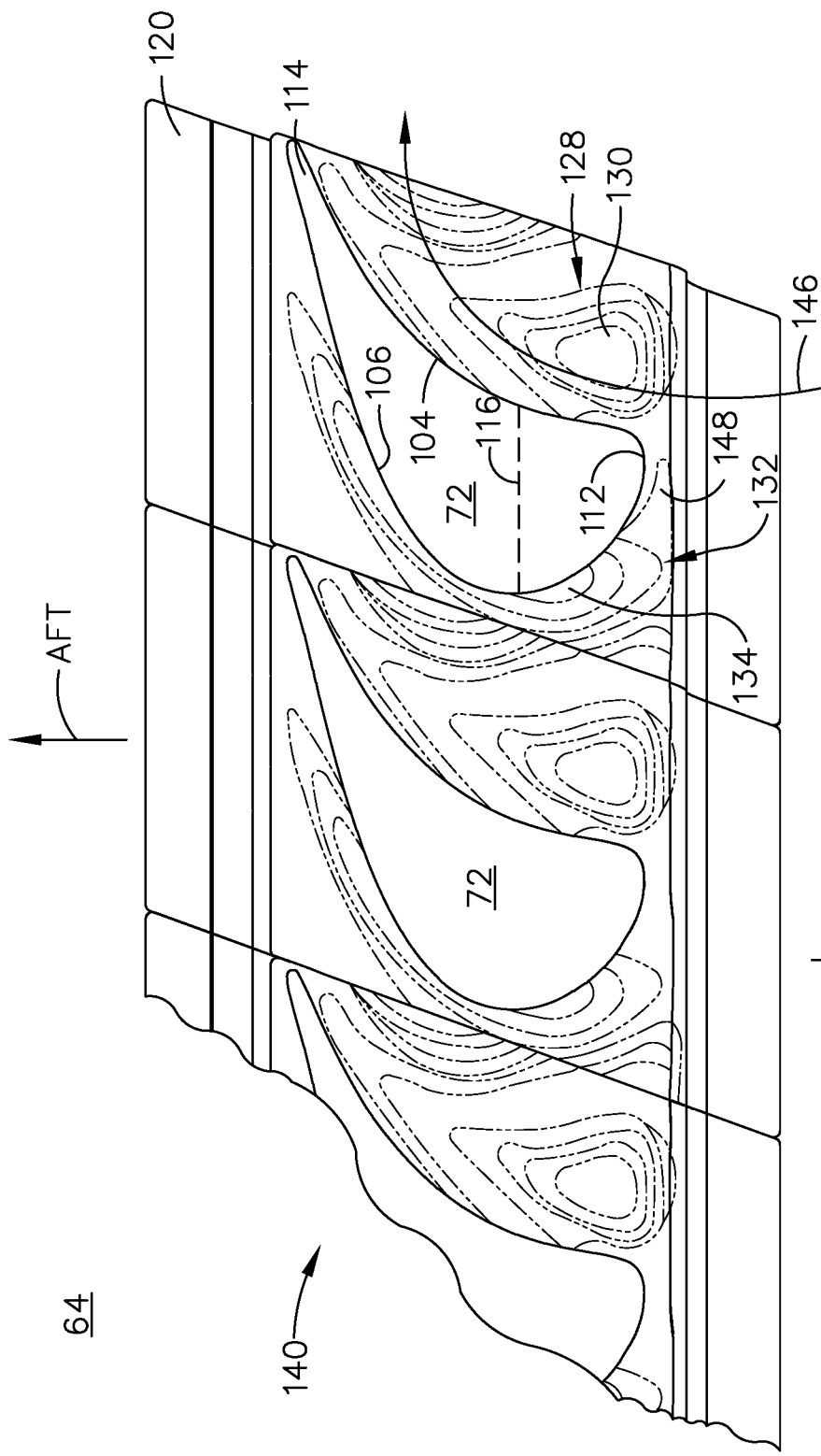
FIG. 4 is an isometric view of a row of airfoil assemblies of FIG. 2 in a second configuration.

FIG. 4 illustrates the HP turbine stage 64 in a second configuration, where the vane 72 can extend from the platform 120 with no fillets used to connect the outer wall 102 to the platform 120. The local maximum 130 can be spaced apart from the pressure side 104 to define the bulge flow channel 146, and the bulge 128 can terminate prior to the trailing edge 114 of the vane 72. The trough 132 can also include at least one local minimum 134; in a non-limiting example, the local minimum 134 can be positioned forward of the maximum thickness point 116 and adjacent the suction side 106 of the vane 72, while the fore portion 148 can form an additional local minimum in front of the leading edge 112 as shown. Similar to FIG. 3, air flowing past the row of airfoils 140 during operation can be directed into the trough 132 and bulge flow channel 146 as it flows past a stage in the engine 10.

It is possible during operation of the turbine engine 10 for secondary flow vortices to form in the flow passages 142 which can disrupt a desired airflow through a stage. One benefit of the scalloped flow surface 126 as described in the present disclosure can be a reduction of secondary flow vortices and a resulting increase of engine efficiency. In addition, during engine operation, a purge airflow can exit a forward cavity at the hub or the casing surface 46 (FIG. 1). In such a case, it can be appreciated that aspects such as extending the bulge 128 and trough 132 into the cavity 136 can direct airflows along the suction side 106 (FIG. 2) and keep them near the vane 72, which can increase work done by the vane 72 and also reduce mixing losses that can occur from the purge airflow. It can be further appreciated that the increased work and reduced mixing losses can also increase engine efficiency.

The turbine engine 10 can further comprise another airfoil assembly 200 according to a second embodiment of the disclosure. The airfoil assembly 200 is similar to the airfoil assembly 100, therefore, like parts will be identified with like numerals increased by 100, with it being understood that the description of the like parts of the first embodiment applies to the second embodiment, unless otherwise noted.

Turning to FIG. 5A, the airfoil assembly 200 can include an airfoil such as a vane 172 with an outer wall 202, leading edge 212, and trailing edge 214, as well as a platform 220 with a fore edge 222, aft edge 224, and flow surface 226. The flow surface 226 can be scalloped with at least one bulge 228 having a local maximum 230 as shown. The fore edge 222 can be shaped or curved to include a height variance in a radial (R) direction as shown in FIG. 5B, where in one example a fore local minimum 250 can be positioned forward of the leading edge 212. In addition, the fore edge 222 can also be shaped or curved with a forward-to-aft variance in an axial (A) direction as shown in FIG. 5C, where a protruding portion 252 can extend forward of the leading edge 212.

The airfoil assembly 200 can also include a fillet 218, and it is further contemplated that the fillet 218 can be integrated with the scalloped flow surface 226. In such a case the fillet 218 can be placed on top of the scalloped flow surface 226 and blended into the contours along the flow surface 226. The fillet 218 can also be shaped to seamlessly blend into the outer wall 202 and flow surface 226, where the fillet 218 tangentially matches the outer wall 202 and flow surface 226.

Figure 6:
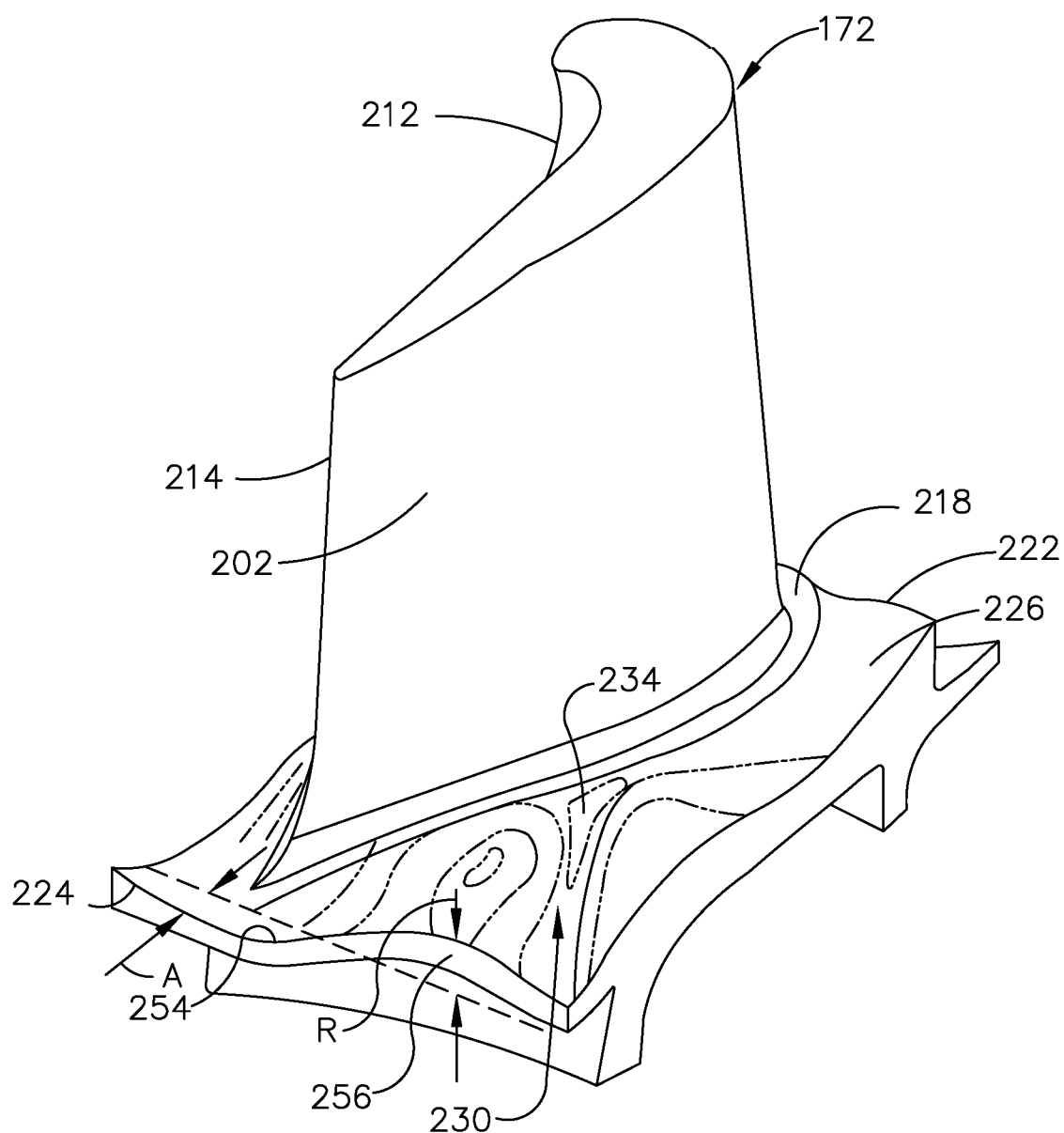
FIG. 6 is a rear isometric view of the airfoil assembly of FIG. 5A.

The platform 220 can also be shaped or curved near the aft edge 224 as shown in FIG. 6. It is contemplated that the flow surface 226 can include a trough 232 with a local minimum 234 located adjacent a suction side 206 of the vane 172. In addition, the aft edge 224 can include a height variance in the radial (R) direction with an aft local minimum 254 similar to that shown in FIG. 5B, as well as a forward-to-aft variance with a trailing portion 256 extending in the aft direction similar to that shown in FIG. 5C.

The turbine engine 10 can further comprise another airfoil assembly 300 according to a third embodiment of the disclosure. As before, the airfoil assembly 300 is similar to the airfoil assembly 100, therefore, like parts will be identified with like numerals further increased by 100, with it being understood that the description of the like parts of the first embodiment applies to the third embodiment, unless otherwise noted.

Figure 7:
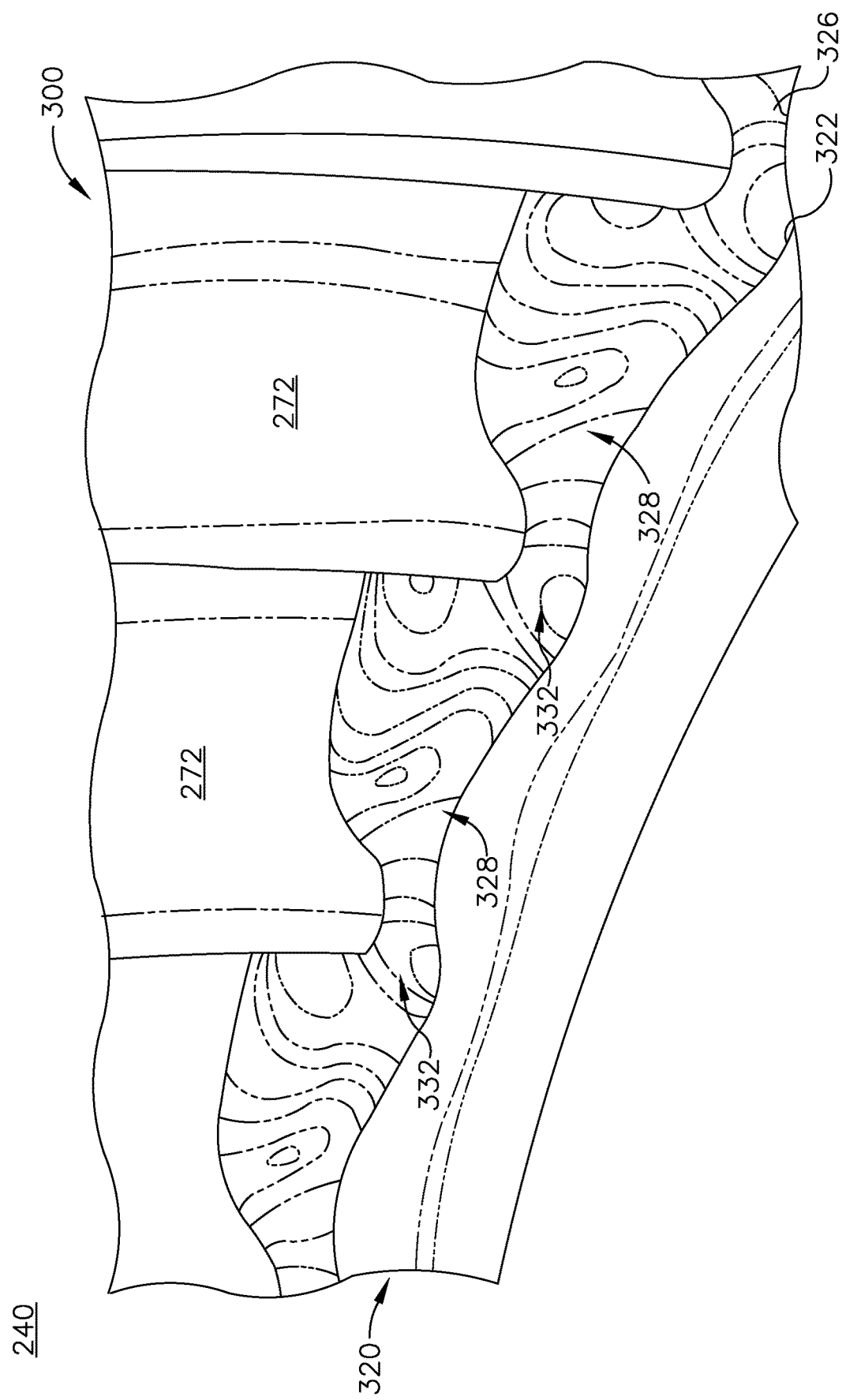
FIG. 7 is an isometric view of a row of airfoil assemblies of FIG. 1 according to a third embodiment.

FIG. 7 illustrates a portion of a stage, such as the HP turbine stage 64 (FIG. 1), having an annular row 240 of airfoil assemblies 300. The airfoil assembly 300 can include an airfoil such as the vane 272, as well as a platform 320 with a fore edge 322 and flow surface 326 as shown in FIG. 7. The flow surface 326 can be scalloped with multiple bulges 328, each bulge 328 having a local maximum 330, as well as multiple troughs 332 with each trough 332 having a local minimum 334.

Figure 8:
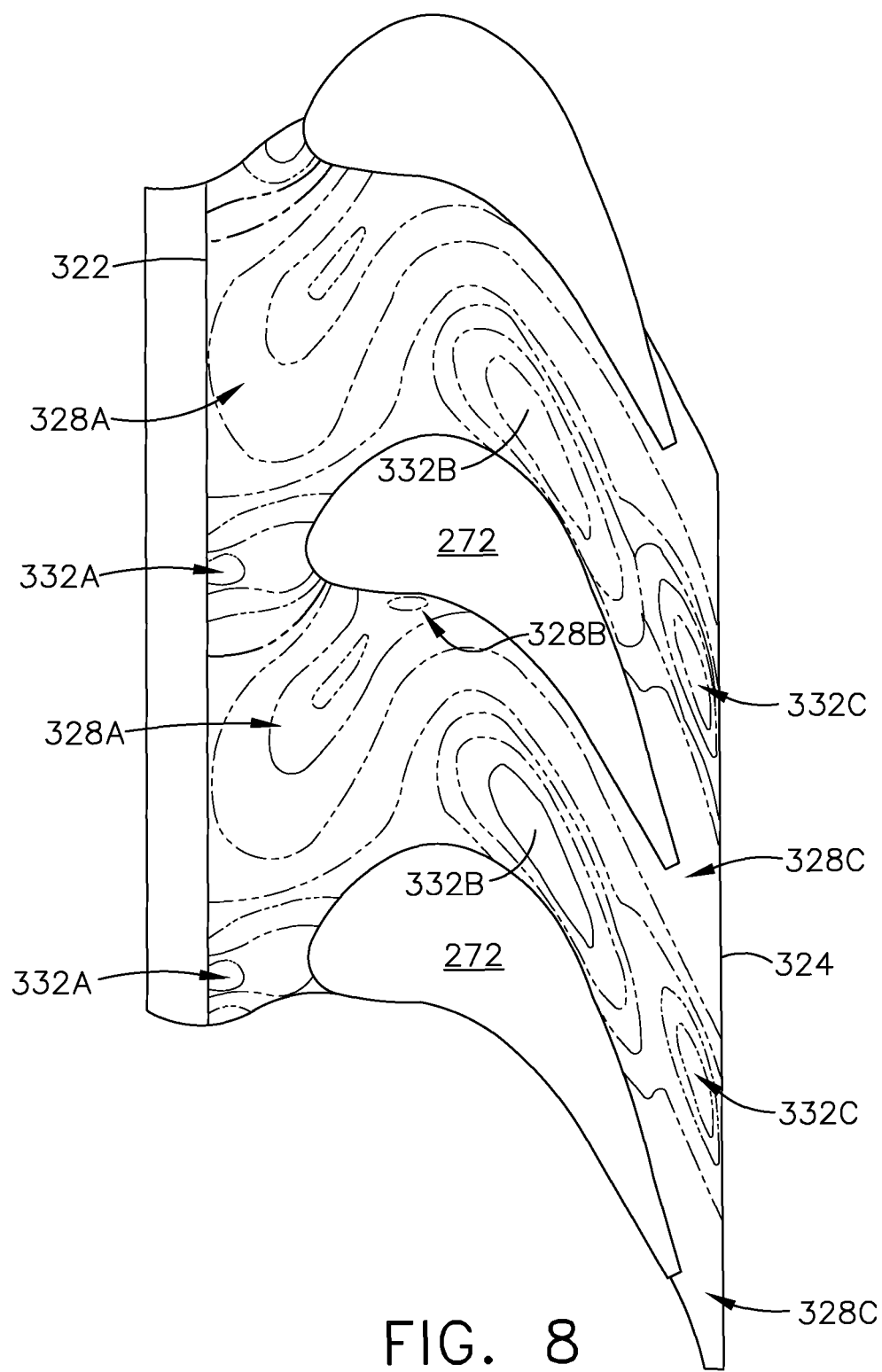
FIG. 8 is a radial top view of the airfoil assemblies of FIG. 7.

When viewed in a radial direction as shown in FIG. 8, it is contemplated that the bulges 328 and troughs 332 can form an alternating or "checkerboard" pattern. A first trough 332A can be positioned forward of the vane 272, and a first bulge 328A can be positioned forward of, and between, adjacent vanes 272 as shown. In addition, a second trough 332B can be positioned adjacent a suction side 306 of the vane 272 and a third trough 332C can be positioned adjacent the aft edge 324. Furthermore, a second bulge 328B and a third bulge 328C can be positioned adjacent the second trough 332B and third trough 332C, respectively, to form the checkerboard pattern in the flow surface 326. It is further contemplated that any desired combination and positioning of bulges 328 and troughs 332 can be used along the flow surface 326. In operation, air flowing past the airfoil assemblies 300 can be directed to different portions of the platform 320 through use and positioning of the checkerboard patterning of bulges 328 and troughs 332.

It can be appreciated that the use of scalloped flow surfaces as described herein, including aspects such as axially-varied or radially-varied platform edges as well as strategic positioning of bulges and troughs along the flow surface, can control local air pressures in the stages to tailor local airflows around the airfoils, increase work done by the airfoils, reduce secondary flow vortices between airfoils, improve engine efficiency, and reduce fuel consumption.

It will be understood that contour lines as used herein can demarcate regions of differing flow surface height along the platform between local maxima and local minima, and are intended to provide exemplary changes in height at different locations along the platform. The height of the flow surface can change in a region between contour lines, either with a continuous or non-continuous rate of change. The lack of an illustrated contour line in a region should not be limited to mean the flow surface height does not change in that region, as certain contour lines may have been omitted for clarity of illustration.

To the extent not already described, the different features and structures of the various embodiments can be used in combination, or in substitution with each other as desired. That one feature is not illustrated in all of the embodiments is not meant to be construed that it cannot be so illustrated, but is done for brevity of description. Thus, the various features of the different embodiments can be mixed and matched as desired to form new embodiments, whether or not the new embodiments are expressly described. In addition, the bulges, local maxima, troughs, and local minima illustrated herein are intended to show exemplary positions along the platform, and it will be understood that combinations of height, depth, shape, profile, and location are contemplated for use in this disclosure. All combinations or permutations of features described herein are covered by this disclosure.

It should be understood that application of the disclosed design is not limited to turbine engines with fan and booster sections, but is applicable to turbojets and turboshaft engines as well.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A stage for at least one of a compressor or a turbine, the stage comprising:
   an annular row of airfoils radially extending from corresponding platforms, the airfoils circumferentially spaced apart to define intervening flow passages;
   each platform having a fore edge and an aft edge;
   each airfoil having an outer wall defining a pressure side and a suction side opposite the pressure side, the outer wall extending axially between a leading edge and a trailing edge defining a chord-wise direction, and the outer wall extending radially between a root and a tip defining a span-wise direction, with the root adjacent the corresponding platform and the leading edge aft of the fore edge of the corresponding platform; and
   at least one of the platforms having a scalloped flow surface including a bulge adjacent the corresponding pressure side and a trough adjacent the corresponding suction side,
      the bulge having a portion extending forward of the corresponding fore edge and a local maximum located aft of the corresponding fore edge and spaced from the corresponding pressure side to define a bulge flow channel between the bulge and the corresponding pressure side, and
      the trough extending adjacent at least a portion of the corresponding suction side with a fore portion of the trough located in front of the corresponding leading edge.

2. The stage of claim 1 further comprising a fillet extending between the at least one of the platforms and the corresponding pressure side and located between the corresponding pressure side and the corresponding bulge.

3. The stage of claim 2 wherein the fillet extends between the corresponding suction side and the corresponding platform and is located between the corresponding suction side and the corresponding trough.

4. The stage of claim 3 wherein the fillet extends about a periphery of the corresponding outer wall.

5. The stage of claim 1 wherein the fore portion of the trough is forward of a maximum thickness point of the corresponding airfoil.

6. The stage of claim 1 wherein the maximum depth of the trough is less than the maximum height of the bulge.

7. The stage of claim 1 wherein the local maximum is aft of the corresponding leading edge.

8. The stage of claim 1 wherein the bulge terminates prior to the corresponding trailing edge.

9. The stage of claim 8 wherein the trough terminates prior to the corresponding trailing edge.

10. The stage of claim 1 wherein the trough has at least one local minimum.

11. The stage of claim 1 wherein each platform comprises a cavity forward of the corresponding fore edge.

12. The stage of claim 11 wherein the bulge and the fore portion of the trough extend into the corresponding cavity.

13. The stage of claim 12 wherein:
    the fore portion of the trough is forward of a maximum thickness point of the corresponding airfoil; and
    the maximum depth of the trough is less than the maximum height of the bulge, and
    the local maximum is aft of the corresponding leading edge.

14. The stage of claim 13 wherein the bulge terminates prior to the corresponding trailing edge and the trough extends to the corresponding trailing edge.

15. The stage of claim 14 wherein the trough has at least one local minimum extending below the trough.

16. The stage of claim 13 further comprising a fillet connecting the at least one of the platforms to the corresponding outer wall and extending between the corresponding bulge and the corresponding pressure side, around the corresponding leading edge, and between the corresponding trough and the corresponding suction side.

17. The stage of claim 1 wherein each airfoil is a stationary vane.

18. The stage of claim 17 wherein the stage is a turbine stage.

19. The stage of claim 1 wherein the at least one of the platforms comprises multiple bulges including the bulge adjacent the corresponding pressure side.

20. The stage of claim 19 wherein the at least one of the platforms comprises multiple troughs including the trough adjacent the corresponding suction side.

21. The stage of claim 1 wherein the at least one of the platforms comprises a second bulge extending aft of the corresponding aft edge.

22. The stage of claim 21 wherein the at least one of the platforms comprises a second trough extending aft of the corresponding aft edge.

23. The stage of claim 1 wherein the fore edge of the at least one of the platforms comprises a protruding portion extending in the forward direction.

24. The stage of claim 1 wherein the aft edge of the at least one of the platforms comprises a trailing portion extending in the aft direction.

25. A stage for a turbine in a turbine engine, the stage comprising:
    an annular row of airfoils radially extending from corresponding platforms, the airfoils circumferentially spaced apart to define intervening flow passages;
    each platform having a fore edge and an aft edge and a cavity fore of the fore edge;
    each airfoil having an outer wall defining a pressure side and a suction side, opposite the pressure side, the outer wall extending axially between a leading edge and a trailing edge defining a chord-wise direction, and the outer wall extending radially between a root and a tip defining a span-wise direction, with the root adjacent the corresponding platform and the leading edge aft of the fore edge of the corresponding platform; and
    at least some of the platforms having a scalloped flow surface including a bulge adjacent the corresponding pressure side and a trough adjacent the corresponding suction side,
        the bulge having a portion extending into the corresponding cavity and a local maximum located aft of the corresponding fore edge and spaced from the corresponding suction side to define a bulge flow channel between the bulge and the corresponding pressure side, and
        the trough extending along the at least a portion of the corresponding suction side and into the corresponding cavity, with a portion of the trough located in front of the corresponding leading edge.

26. The stage of claim 25 wherein a local minimum of each trough is forward of a maximum thickness point of the corresponding airfoil.

27. The stage of claim 26 wherein no portion of each trough extends aft of the maximum thickness point of the corresponding airfoil.

28. The stage of claim 25 further comprising a fillet extending between the at least some of the platforms and the corresponding pressure side and located between the corresponding pressure side and the corresponding bulge.

29. The stage of claim 28 wherein the fillet extends between the corresponding suction side and the corresponding platform and is located between the corresponding suction side and the corresponding trough.

30. The stage of claim 29 wherein the fillet extends about the periphery of the corresponding outer wall.

31. The stage of claim 25 wherein the maximum depth of each trough is less than the maximum height of each bulge.

32. The stage of claim 25 wherein each local maximum is aft of the corresponding leading edge.

33. The stage of claim 25 wherein each bulge terminates prior to the corresponding trailing edge.

34. The stage of claim 25 wherein each trough has at least one local minimum.

35. The stage of claim 25 wherein the at least some of the platforms comprises multiple bulges including the corresponding bulge adjacent the corresponding pressure side.

36. The stage of claim 35 wherein the at least some of the platforms comprise multiple troughs including the corresponding trough adjacent the corresponding suction side.

37. The stage of claim 25 wherein the at least some of the platforms comprise a second bulge extending aft of the corresponding aft edge.

38. The stage of claim 37 wherein the at least some of the platforms comprise a second trough extending aft of the corresponding aft edge.

39. The stage of claim 25 wherein the fore edge of the at least some of the platforms comprises a protruding portion extending in the forward direction.

40. The stage of claim 25 wherein the aft edge of the at least some of the platforms comprises a trailing portion extending in the aft direction.

* * * * *

UNITED STATES PATENT AND TRADEMARK OFFICE
CERTIFICATE OF CORRECTION

PATENT NO. : 10,577,955 B2  
APPLICATION NO. : 15/637791  
DATED : March 3, 2020  
INVENTOR(S) : Connor Marie Shirley, Harjit Singh Hura and Paul Hadley Vitt Page 1 of 1

It is certified that error appears in the above-identified patent and that said Letters Patent is hereby corrected as shown below:

In the Claims

Column 9, Claim 25, Line 47:
"suction side" should read --pressure side--

Signed and Sealed this
Twenty-ninth Day of December, 2020

Andrei Iancu
*Director of the United States Patent and Trademark Office*